(12) United States Patent
Jin et al.

(10) Patent No.: US 7,440,660 B1
(45) Date of Patent: Oct. 21, 2008

(54) TRANSDUCER FOR HEAT ASSISTED MAGNETIC RECORDING

(75) Inventors: Xuhui Jin, Pittsburgh, PA (US);
Chubing Peng, Allison Park, PA (US);
William Albert Challener, Sewickley, PA (US); Edward Charles Gage, Mars, PA (US); Michael Allen Seigler, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/872,927

(22) Filed: Oct. 16, 2007

(51) Int. Cl.
*G02B 6/26* (2006.01)
*G11B 11/00* (2006.01)
*G11B 7/135* (2006.01)

(52) U.S. Cl. .................. 385/43; 385/11; 385/129; 385/130; 385/131; 385/14; 369/13.32; 369/112.27

(58) Field of Classification Search .................. 385/11, 385/31, 14, 42, 43, 88, 92, 94, 129, 130, 385/131, 132, 146; 369/44.11, 44.14, 44.21, 369/41.22, 112.01, 112.11, 112.16, 112.21, 369/112.27, 142, 13.32
See application file for complete search history.

(56) References Cited

U.S. PATENT DOCUMENTS

| | | | |
|---|---|---|---|
| 4,861,128 A * | 8/1989 | Ishikawa et al. ............... 385/37 |
| 4,994,818 A | 2/1991 | Keilmann .................... 343/786 |
| 5,004,307 A | 4/1991 | Kino et al. .................... 350/1.2 |
| 5,208,800 A * | 5/1993 | Isobe et al. ............. 369/112.27 |
| 5,272,330 A | 12/1993 | Betzig et al. ................. 250/216 |
| 5,428,584 A * | 6/1995 | Yoshida et al. ........... 369/13.32 |
| 5,982,716 A | 11/1999 | Kino et al. ..................... 369/14 |
| 6,055,220 A | 4/2000 | Mamin et al. ................ 369/112 |
| 6,320,708 B1 | 11/2001 | Ueyanagi et al. ............. 359/824 |
| 7,272,079 B2 | 9/2007 | Challener ................. 369/13.17 |
| 2001/0004348 A1 | 6/2001 | Ueyanagi ..................... 369/118 |
| 2004/0001394 A1 | 1/2004 | Challener et al. ......... 369/13.32 |
| 2004/0001420 A1 | 1/2004 | Challener ............... 369/112.27 |
| 2005/0041950 A1 | 2/2005 | Rottmayer et al. .......... 385/147 |
| 2005/0078565 A1 | 4/2005 | Peng et al. ................ 369/13.32 |
| 2006/0182393 A1 | 8/2006 | Sendur et al. .................. 385/39 |
| 2007/0115787 A1 | 5/2007 | Itagi et al. ...................... 369/99 |

OTHER PUBLICATIONS

W. Challener et al., "Miniature Planar Solid Immersion Mirror With Focused Spot Less Than a Quarter Wavelength," Optics Express, vol. 13, Issue 18, Sep. 2005, pp. 7189-7197.

* cited by examiner

*Primary Examiner*—Brian M Healy
(74) *Attorney, Agent, or Firm*—Robert P. Lenart, Esq.; Pietragallo Gordon Alfano Bosick & Raspanti, LLP (57) ABSTRACT

An apparatus includes a first waveguide configured to focus an electromagnetic wave to a focal region, and a second waveguide defining an opening having an end positioned adjacent to the focal region, the second waveguide including a first metallic layer, and second and third layers positioned on opposite sides of the first metallic layer, wherein the first metallic layer has a first propagation constant larger than propagation constants of the second and third layers.

20 Claims, 9 Drawing Sheets

TRANSDUCER FOR HEAT ASSISTED MAGNETIC RECORDING

BACKGROUND

In thermally assisted magnetic/optical recording, information bits are recorded on a storage layer at elevated temperatures, and a heated area in the storage layer determines the data bit dimensions. One approach uses a planar solid immersion mirror (PSIM) lens, fabricated on a planar waveguide and a metallic nano-structure of a specific shape, called a near-field optical transducer, placed near the PSIM focus. The PSIM directs light onto the near-field transducer to form a local surface plasmon (LSP). A high electric field surrounding the near-field transducer appears, due to the collective oscillations of electrons in the metal. Part of this field will tunnel into an adjacent storage medium and get absorbed, raising the temperature of the medium locally for recording. The LSP is sensitive to the shape of the near-field transducer and its location in the waveguide. The near-field transducer may be buried in a dielectric of low thermal dissipation. Light is absorbed in the near-field transducer, creating heat that requires a cooling mechanism for its functioning.

SUMMARY

In one aspect, the invention provides an apparatus including a first waveguide configured to focus an electromagnetic wave to a focal region, and a second waveguide defining an opening having an end positioned adjacent to the focal region, the second waveguide including a first metallic layer, and second and third layers positioned on opposite sides of the first metallic layer, wherein the first metallic layer has a first propagation constant larger than propagation constants of the second and third layers.

In another aspect, the invention provides an apparatus including a first waveguide configured to focus an electromagnetic wave to a focal region, and a second waveguide including a metallic structure defining an opening having an end positioned adjacent to the focal region and a multilayer structure positioned in the opening, the multilayer structure including a first layer of dielectric material, and second and third layers of dielectric material positioned on opposite sides of the first layer, wherein the opening in the metallic structure includes first and second walls adjacent to ends of the first layer of dielectric material and a third wall, wherein the second layer of dielectric material is positioned between the first layer of dielectric material and the third wall.

In another aspect, the invention provides an apparatus including means for focusing an electromagnetic wave to a focal region, and a waveguide defining an opening having an end positioned adjacent to the focal region, the waveguide including a first metallic layer, and second and third layers positioned on opposite sides of the first metallic layer, wherein the first metallic layer has a first propagation constant larger than propagation constants of the second and third layers.

These and various other features and advantages will be apparent from a reading of the following detailed description.

DETAILED DESCRIPTION OF THE INVENTION

Figure 1:
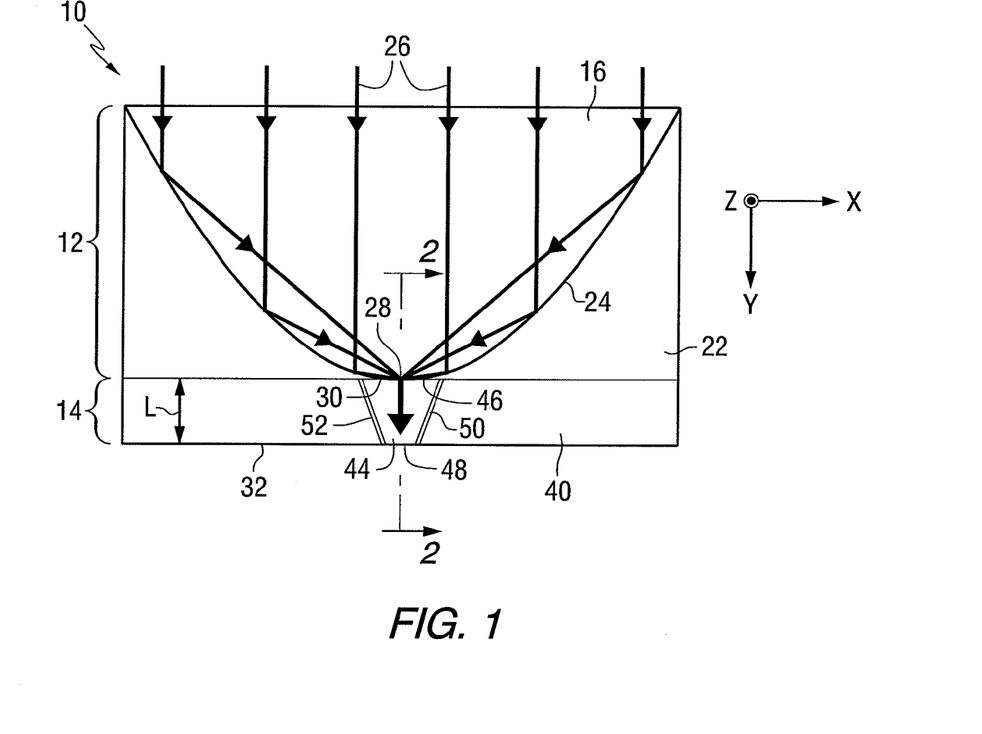
FIG. 1 is a schematic cross-sectional view of an optical transducer in accordance with an aspect of the invention.
Figure 2:
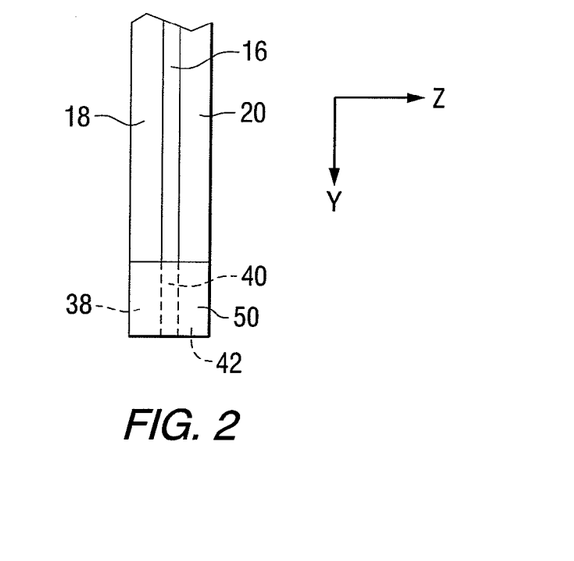
FIG. 2 is a cross-sectional view of a portion of the transducer of FIG. 1, taken along lines 2-2.

FIG. 1 is a schematic cross-sectional view of an optical transducer 10 in accordance with an aspect of the invention. FIG. 2 is a cross-sectional view of a portion of the transducer of FIG. 1 taken along line 2-2. The optical transducer 10 includes two waveguides 12 and 14. In this example, waveguide 12 forms a solid immersion mirror that includes a core or guiding layer 16, which can be, for example, $Ta_2O_5$, $SiN_x$ or ZnS. The core layer is sandwiched between cladding layers 18 and 20, which can be, for example, $Al_2O_3$ or $SiO_2$. A material 22, which can be, for example, air or Al, is positioned adjacent to the sidewalls 24 for reflecting an electromagnetic wave 26 into a focus or focal region 28. The sidewalls are shaped to form an interface normal to the waveguide plane, for condensing the electromagnetic wave 26, which can be, for example, ultraviolet, infrared or visible light, to the focus or focal region 28 adjacent to an end 30 of the waveguide. For the purposes of this description, this electromagnetic radiation will be referred to as light.

In one example, the sidewalls have a parabolic shape and form a parabolic mirror. Light traveling in the guiding layer is reflected by the parabolic interface and directed to the focus 28.

Waveguide 12 is a planar waveguide where light is coupled into the waveguide and a focusing element is fabricated for focusing the light into a diffraction-limited spot. The propagated waveguide mode is transverse-electric (TE) polarized with the electric field parallel to the waveguide plane. The focusing element in this example is a solid immersion mirror (SIM). However, other types of focusing elements such as a mode-index lens may also be used. Light can be launched into the waveguide 12 in many ways, such as with a grating coupling, using an end-fire technique, using a tapered waveguide, etc.

Waveguide 14 is a multilayer structure including a plurality of layers 38, 40 and 42 stacked in the Z-direction. The layers are structured and arranged to define an opening, gap or slot 44. Light directed to the focus 28 of waveguide 12 enters the opening at a first end 46 and is further concentrated by waveguide 14 to form an optical spot at a second end 48 of the opening.

The slot in waveguide 14 cuts through the waveguide plane in the direction normal to the first waveguide plane. Walls on the sides of the slot are formed by the first metallic layer 40, and second and third layers 38, 42 positioned on opposite sides of the first metallic layer, wherein walls of the slot formed by the first metallic layer have a propagation constant larger than that of the walls formed by the second or third layers.

In one example, the layers are metal, with the middle layer 40 being a different metal than the outer layers 38 and 42. In another example the middle layer is metal, and the outer layers are a dielectric material such as silicon and silicon carbide. The opening can be tapered such that the first end 46 is wider than the second end 48.

Within the opening, along the Z-direction, light is confined by the effective index guiding of the layer structure. Along the X-direction, the light is confined by the walls of the opening. The opening can be tens of nanometers at the bottom end 48. For good light transmission efficiency, the opening can be tapered along the beam propagation direction, i.e., the Y-direction, and a thin layer 50 of a dielectric material, with lower index of refraction than that of the material in the opening, can be coated on the inner walls 52.

This dielectric material can be the same as the dielectric material of the guiding layer of waveguide 12, or it can be another material selected to provide confinement along the Z-direction. In another example, the waveguide 14 may be positioned such that the focal plane of waveguide 12 is inside of waveguide 14, to achieve a more tightly focused beam at the bottom of the opening and to provide greater transmission efficiency.

Figure 3:
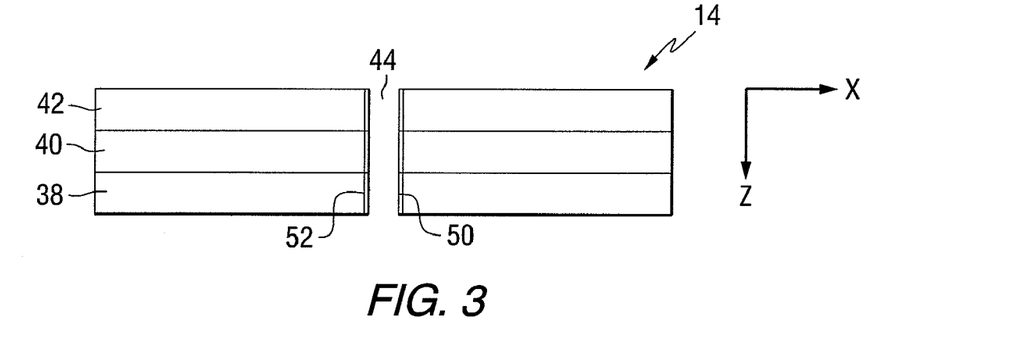
FIG. 3 is a plan view of an air bearing surface of the optical transducer of FIG. 1.

FIG. 3 is a plan view of an air bearing surface 32 of the optical transducer of FIG. 1. The waveguide 14 has no length limitation along the X-direction. Thus the metallic structure can dissipate the heat effectively caused by light absorption in the slot waveguide.

Waveguide 14 has a hetero-structured metal configuration that defines a tapered opening or slot. In one example, the waveguide 14 is constructed with three or more metal layers positioned adjacent to each other and stacked in the Z-direction. A first one of the metal layers is sandwiched between the other two layers. Along the X-direction, light is confined by walls of the opening formed by the first metallic layer with a nanometer separation at the end. Regardless of how small the separation is, there exists a propagating transverse-magnetic (TM) mode, with the electric field along the X-direction. Part of this field will tunnel into an adjacent storage medium and get absorbed, raising the temperature of the medium locally for recording.

Along the Z-direction, light is confined by the waveguide formed by layers 38, 40, and 42, which are structured and arranged to form walls of a slot 44. The middle layer 40 could be made of, for example, silver, copper, or gold depending on the operating wavelength, while the outer layers could be made of, for example, aluminum, gold, copper, platinum, and other metals, or lossy dielectrics such as silicon and silicon carbide. The layers are stacked in a way such that the highest effective index is in the middle, and the layers on opposite sides of the center layer provide abrupt or gradually decreased indices outward along the Z-axis.

The effective index $n_{eff}$, also called a guide index or guiding index, is defined as:

$$n_{eff} = \frac{\beta}{k_0},$$

where $\beta$ is the propagation constant of a waveguide and $k_0$ is the free space wave number.

The opening can be filled with a dielectric material that is the same as the dielectric material of waveguide 12, or another uniform dielectric material of high refractive index. The full tapering angle can vary from about 0° to about 120°, but an optimal angle might exist to provide the highest efficiency.

Figure 4:
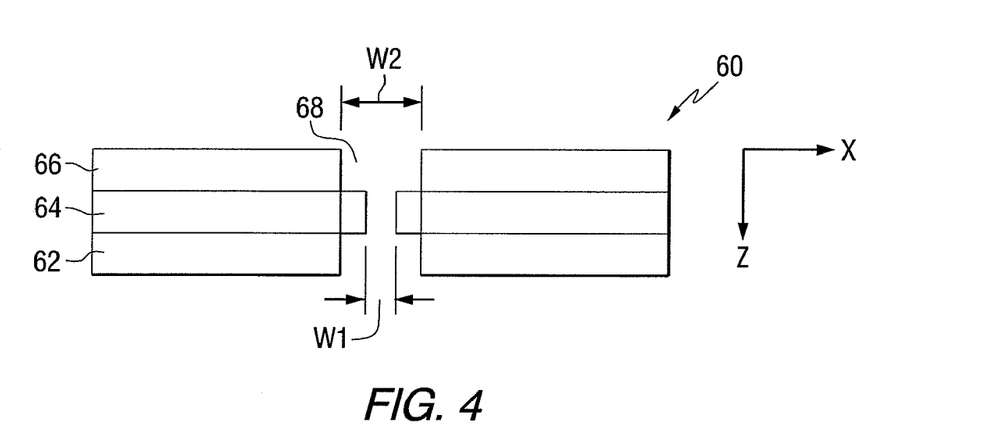
FIG. 4 is a plan view of an air bearing surface of another example of an optical transducer.

FIG. 4 is a plan view of an air bearing surface of another waveguide 60 that can be used in place of the waveguide 14 of FIG. 1. Waveguide 60 is a multilayer structure including a plurality of layers 62, 64 and 66 stacked in the Z-direction. The layers are separated by an opening, gap or slot 68. Light directed to the focus 28 of waveguide 12 enters the opening 68 and would be further concentrated by the waveguide 60 to form an optical spot at a second end of the opening. In one example, the layers are metal, with the middle layer 64 being a different metal than the outer layers 62 and 66. In another example, the middle layer is metallic, and the outer layers 62 and 66 are dielectric materials. In the example of FIG. 4, the opening W1 in layer 64 is smaller than the openings W2 in layers 62 and 66.

Figure 5:
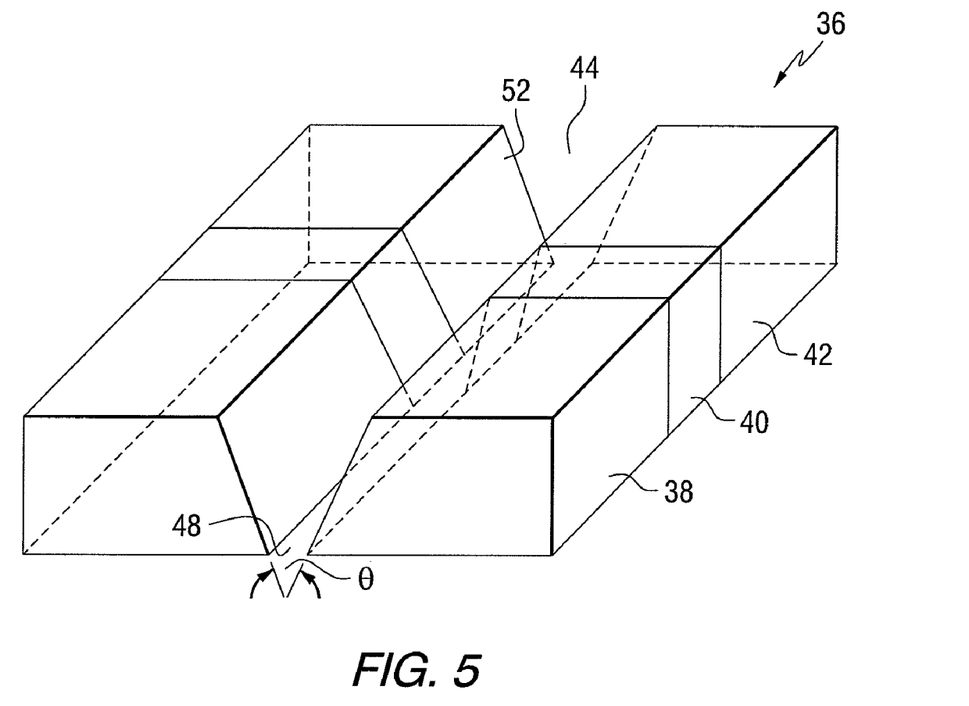
FIG. 5 is an isometric view of elements of the optical transducer of FIG. 1.

FIG. 5 is an isometric view of elements of the optical transducer of FIG. 1. The angle θ between the walls of the opening can be in the range of about 0° to about 120°.

Figure 6:
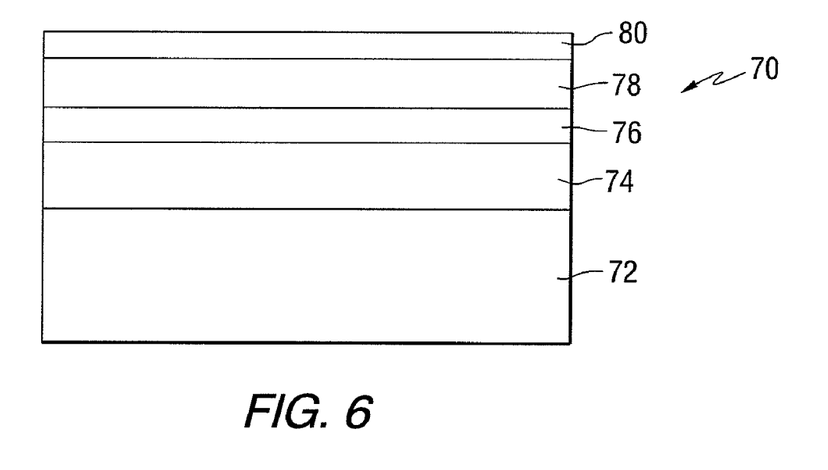
FIG. 6 is a side view of a storage medium that is used to model the performance of an optical transducer.

FIG. 6 is a side view of a storage medium 70 that was used to model the performance of the optical transducer. The storage medium includes a substrate 72, a heat sink layer 74, a thermal barrier layer 76, a magnetic storage layer 78, and a dielectric layer 80. In one example, the dielectric layer such as the lubricating/overcoat layer on the storage layer can be 8 nm thick and modeled with a refractive index of n=1.5, the magnetic storage layer can be a 15 nm thick cobalt layer, the thermal barrier layer such as $ZrO_2$ can be 10 nm thick, the heat sink layer can be gold, and the substrate can be glass or silicon.

Figure 7:
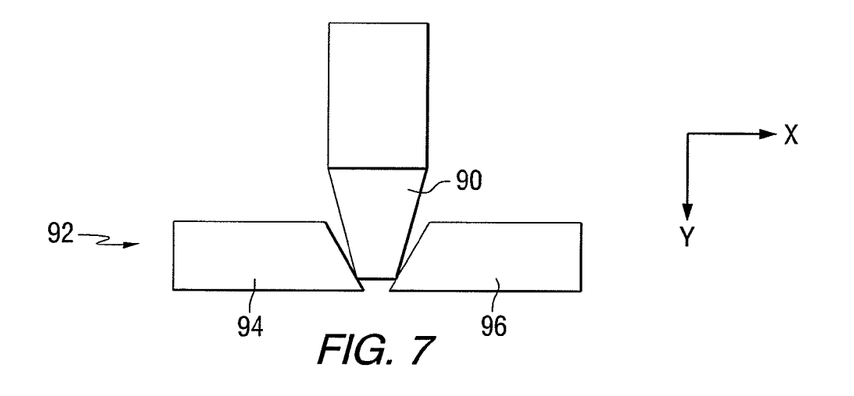
FIG. 7 is a side view of a portion of a magnetic write pole and a portion of a waveguide.
Figure 8:
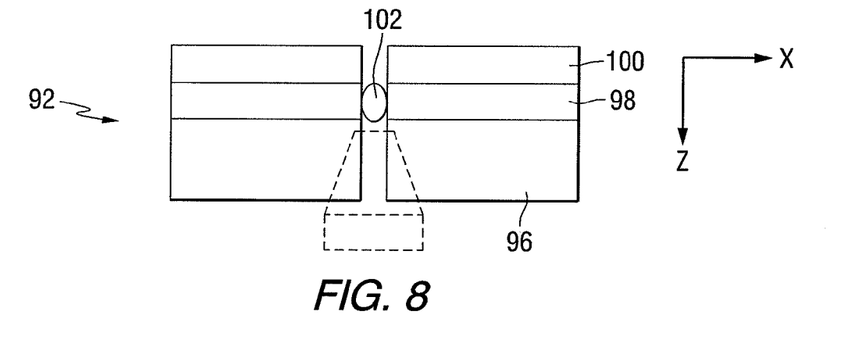
FIG. 8 is a plan view of an air bearing surface of the waveguide of FIG. 7.
Figure 9:
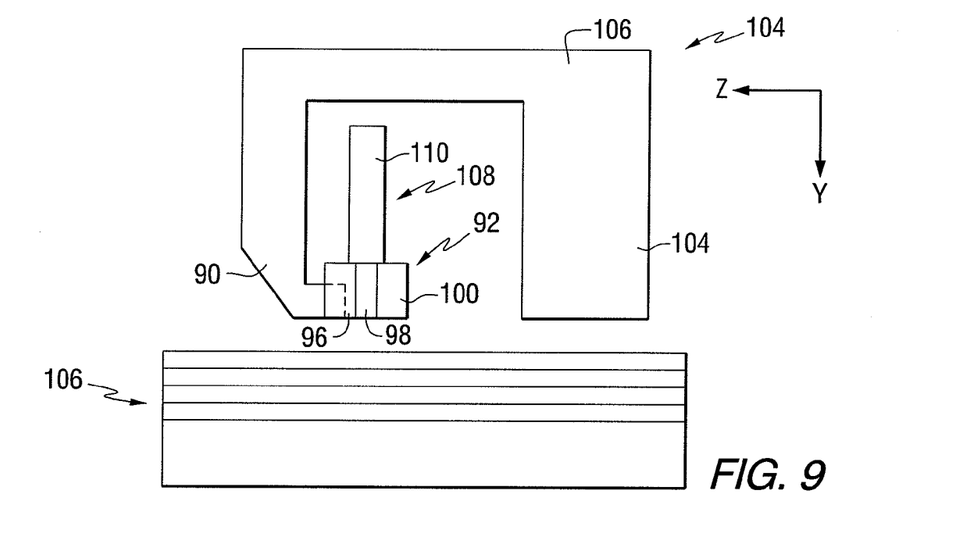
FIG. 9 is a schematic side view of a recording head and an adjacent storage medium.

For heat assisted magnetic recording (HAMR), the magnetic poles of a recording head can be fully integrated with the optical components. In one scheme, a tapered magnetic write pole is introduced in the middle of the slot of a waveguide, and recessed from the air bearing surface (ABS) as shown in FIGS. 7-9. FIG. 7 is a side view of a portion of a magnetic write pole 90 and a portion of a waveguide 92. FIG. 8 is a plan view of an air bearing surface 94 of the waveguide 92 of FIG. 7. The waveguide is shown to include layers 96, 98 and 100. As described above, the layers could be metallic layers, or the middle layer could be a metallic layer and the outer layers could be a dielectric material. Oval 102 illustrates an optical spot.

FIG. 9 is a schematic side view of a recording head 104 and an adjacent storage medium 106. The recording head includes a write pole 90 magnetically coupled to a return pole 104 through a yoke 106. A coil, not shown, can be used to induce a magnetic write field in the write pole, according to known techniques. The recording head further includes an optical transducer 108 that includes a first waveguide 110 and a second waveguide 92. In the structure of FIGS. 7, 8 and 9, the write pole has a piece that is located near the center of the opening of the waveguide 92.

Figure 10:
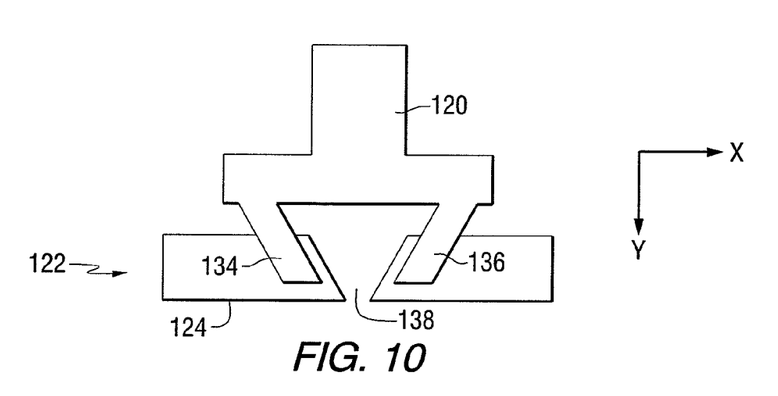
FIG. 10 is a side view of a portion of another magnetic write pole and a portion of a waveguide.
Figure 11:
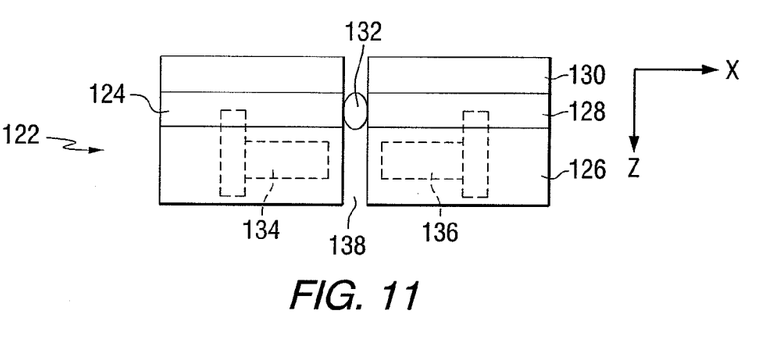
FIG. 11 is a plan view of an air bearing surface of the waveguide of FIG. 10.
Figure 12:
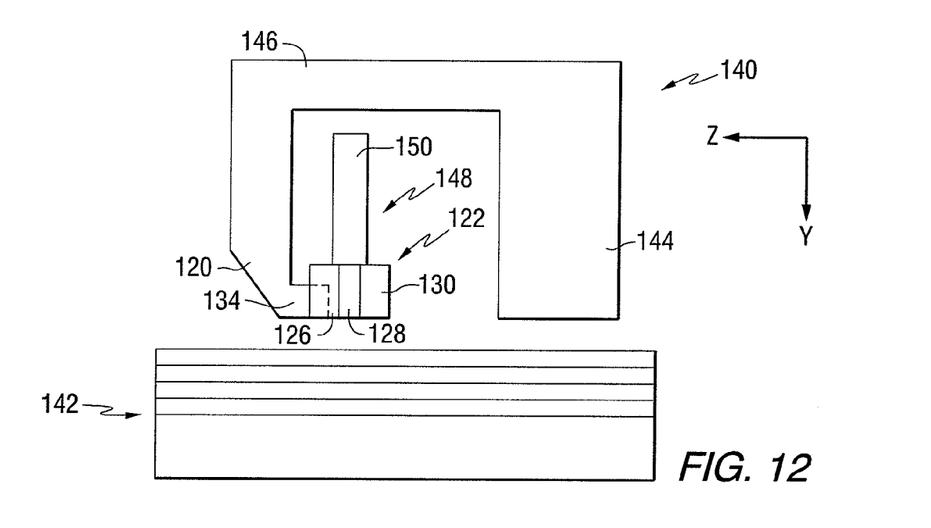
FIG. 12 is a schematic side view of another recording head and an adjacent storage medium.

In another scheme, the write pole is split into two pieces and the ends of the two pieces are buried and shielded by the metal in a waveguide as shown in FIGS. 10-12. In the second approach, the write field in the center opening between the two metal pole pieces could be perpendicular to the medium.

FIG. 10 is a side view of a portion of a magnetic write pole 120 and a portion of a waveguide 122. FIG. 11 is a plan view of an air bearing surface 124 of the waveguide 122 of FIG. 10. The waveguide is shown to include layers 126, 128 and 130. As described above, the layers could be metallic layers, or the middle layer could be a metallic layer and the outer layers could be a dielectric material. Oval 132 illustrates an optical spot. The write pole 120 is shown to include two pole pieces 134 and 136 positioned on opposite sides of an opening 138 in the waveguide.

FIG. 12 is a schematic side view of a recording head 140 and an adjacent storage medium 142. The recording head includes a write pole 120 magnetically coupled to a return pole 144 through a yoke 146. A coil, not shown, can be used to induce a magnetic write field in the write pole, according to known techniques. The recording head further includes an optical transducer 148 that includes a first waveguide 150 and a second waveguide 122. In the structure of FIGS. 10, 11 and 12, the write pole is split into two parts that are positioned on opposite sides of the opening of the second waveguide.

The examples described above are compatible with wafer level thin film processes. Plating processes can be used to control the growth of the multilayer metallic structure. The focused spot size is scalable by varying the end separation of the tapered slot and deposition thickness of the middle metal layer. Optical and magnetic alignment could be achieved in the fabrication process.

The performance of several transducers has been simulated. In one example, a solid immersion mirror (SIM) waveguide 12 focuses light onto a waveguide 14 as shown in FIG. 1. The SIM is assumed to have a 50 µm top opening and ~6 µm end. The magnetic storage medium as shown in FIG. 6 includes a 5 nm thick dielectric layer (n=1.5), a 15 nm thick cobalt layer, a 10 nm thermal barrier layer, and a gold heat sink layer, coated on a glass substrate. The power efficiency has been evaluated by calculating the optical power absorbed in the volume of a cylinder of 100 nm in diameter and 15 nm in height centered at the focused optical spot. The total absorption in the 15 nm thick magnetic layer is also computed.

In one example, the first waveguide uses $Ta_2O_5$ (n=2.1) as the core material and $Al_2O_3$ (n=1.6) as the cladding material. At a core thickness of 100 nm and light wavelength of 660 nm, the fundamental transverse-electric (TE) waveguide mode has an effective index $n_{eff}$=1.7514. The metallic tapered slot waveguide 14 includes a silver layer (n=0.14+i4.2) sandwiched between two aluminum (n=1.53+i7.89) layers. Waveguide 14 is 175 nm long, 20 nm wide at the end 48, and 288 nm wide at the entrance 46. It has taper angle θ=75°. The thickness of the silver layer is 40 nm. Inside the slot it has the same layer structure as the first waveguide.

Figure 13:
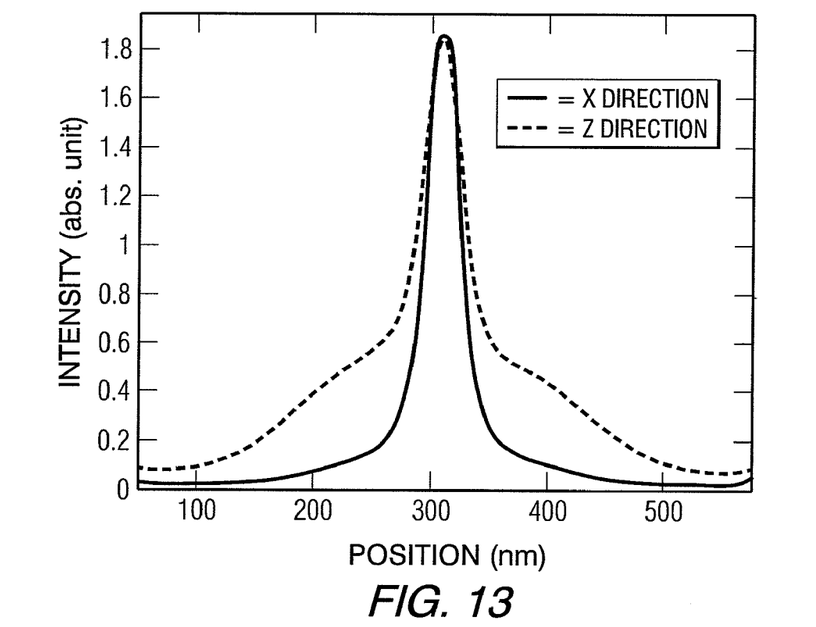
FIGS. 13-18 are graphs of simulated light absorption in the storage layer of the storage medium of FIG. 6.

FIG. 13 shows the calculated electric field intensity along the X- and Z-directions through the middle of the focused spot. Along the X-direction, the FWHM optical spot size is ~33 nm, and along the Z-direction, it is ~48 nm. About 10.7% of optical power is absorbed in the 100 nm diameter cylinder centered at the focused spot and the total absorption in the 15 nm thick magnetic layer reaches 33.2%.

If the head-to-medium spacing changes to 7.5 nm, which includes an overcoat of 2.5 nm thick, an air gap of 2.5 nm thick, and a lube of 2.5 nm thick, the FWHM spot size becomes ~40 nm by 80 nm, and the portion of the absorbed power drops to 5.0%. Modeling shows that both the spot size and efficiency is not sensitive to the change in the thickness of the core layer in the range of 100 nm to 200 nm.

Figure 14:
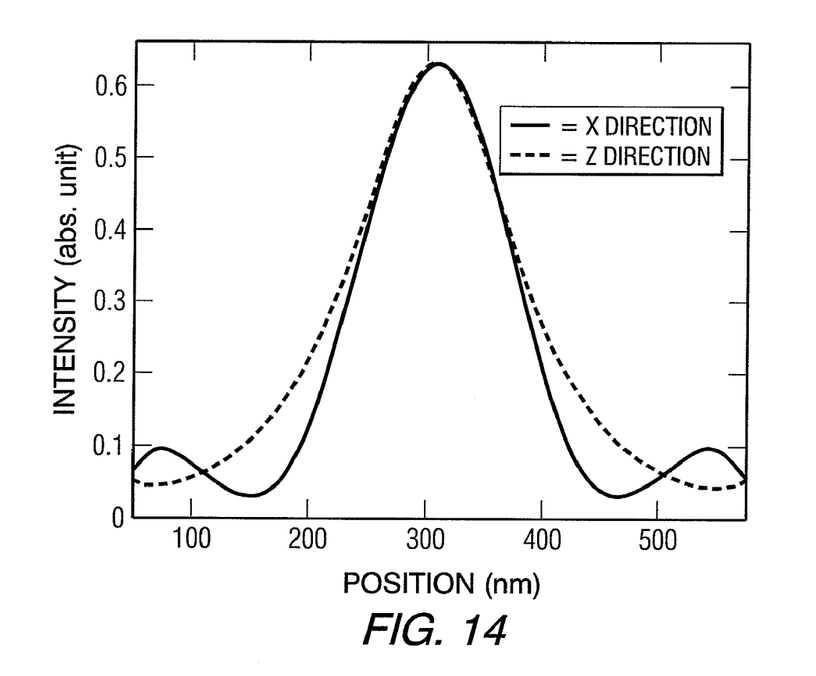

As a comparison, the optical power has been computed for the case without waveguide 14. The line scan profile through the center of the focused spot is shown in FIG. 14. The FWHM optical spot size is 148 nm along the X-direction and 158 nm along the Z-direction, and the total absorption, including the sidelobes, is ~48.5%. This means that waveguide 14 compresses the SIM focused spot by a factor of 14.8 with light delivery efficiency of 22.1% for the case of 5 nm top dielectric layer 80.

Figure 15:
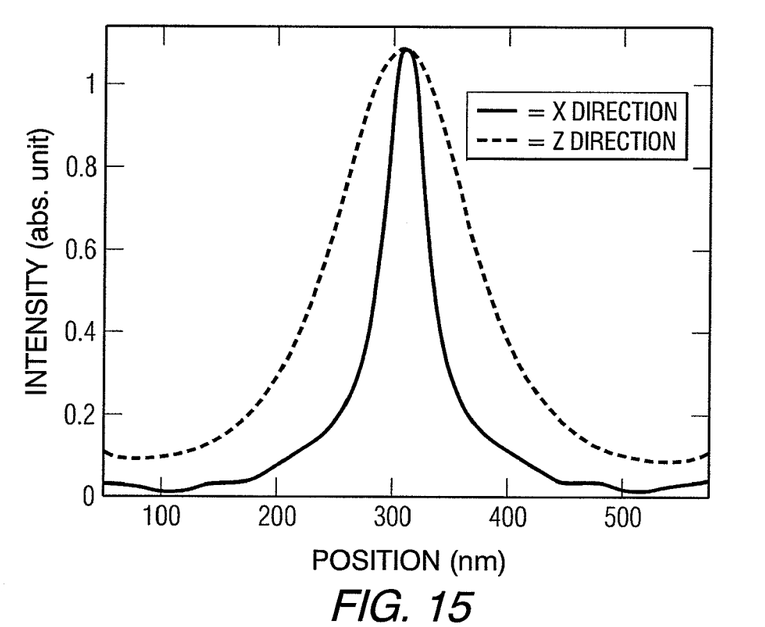

FIG. 15 shows the calculated results for a waveguide having a metal taper without the middle silver layer. The FWHM optical spot size becomes 43 nm along the X-direction and 138 nm along the Z-direction. The efficiency of the absorbed power in the volume of the 100 nm cylinder in the magnetic layer is ~10.8%, and the total absorption in the 15 nm thick magnetic layer is ~35%. These indicate that the silver layer 40 plays a significant role in reducing the spot size along the Z-direction by a factor of 2.88 without decreasing the light delivery efficiency substantially. That is, the optical spot is condensed and more focused in the presence of the silver layer.

Figure 16:
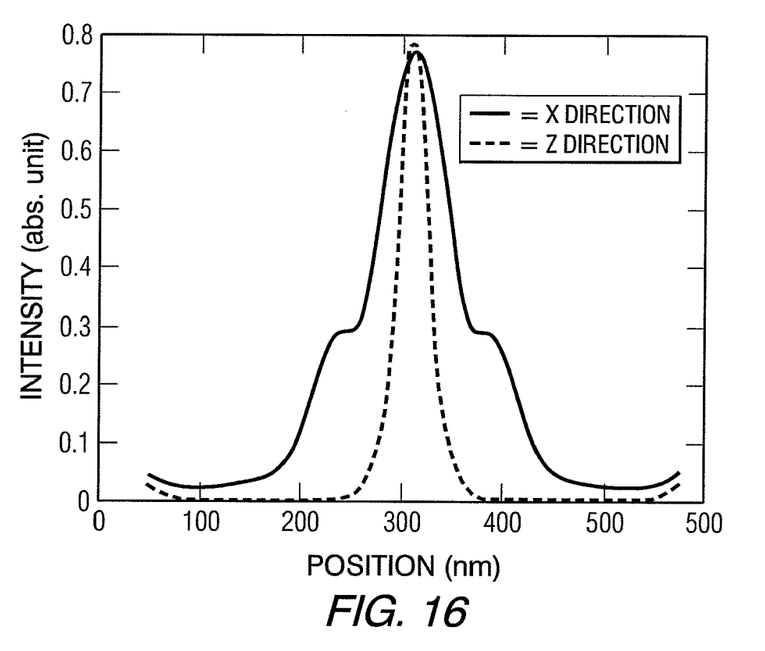

Another example uses copper as the middle metal layer 40 in the tapered waveguide, sandwiched by gold layers. The geometry parameters are the same as in the previously described example. FIG. 16 shows the calculated results, which give the FWHM optical spot size of about 33 nm along the X-direction and about 85 nm along the Z-direction. A further reduction of the spot size could be achieved by optimizing the geometry parameters. The efficiency of the absorbed power in the 100 nm cylinder is ~5.6%, and the total absorption in the 15 nm thick magnetic recording layer is ~11.8%.

In another example, the first waveguide uses $Ta_2O_5$ (n=2.1) as the core material and $Al_2O_3$ (n=1.6) as the cladding material. At core thickness of 125 nm and a light wavelength of 830 nm, the fundamental TE waveguide mode has a propagation constant of β=1.75. The metallic taper 36 includes three metal layers, in which a gold layer (n=0.189+i5.41) is sandwiched between two aluminum (n=2.73+i8.3) layers. The metallic taper has the full tapering angle of 55°. It is 80 nm long, 15 nm wide at the end 48, and 98 nm wide at the entrance 46. The thickness of the gold layer is 50 nm. Inside the slot it has the same layer structure as the first waveguide.

Figure 17:
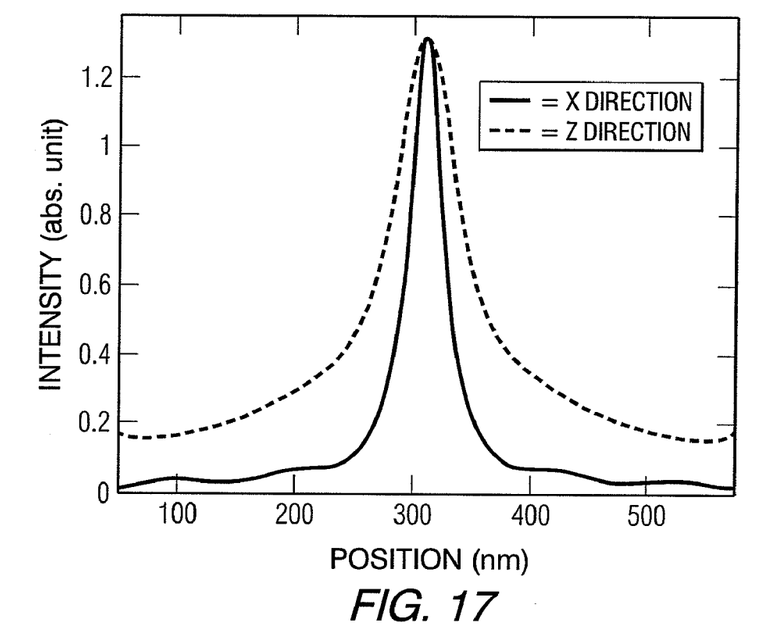

FIG. 17 shows the calculated electric field intensity through the middle of the focused spot along the X- and Z-directions. The FWHM optical spot size is about 33 nm along the X-direction and about 75 nm along the Z-direction. The efficiency of the absorbed power in the 100 nm cylinder is 5.6%, and the total absorption in the 15 urn thick magnetic recording layer is 20.1%.

Figure 18:
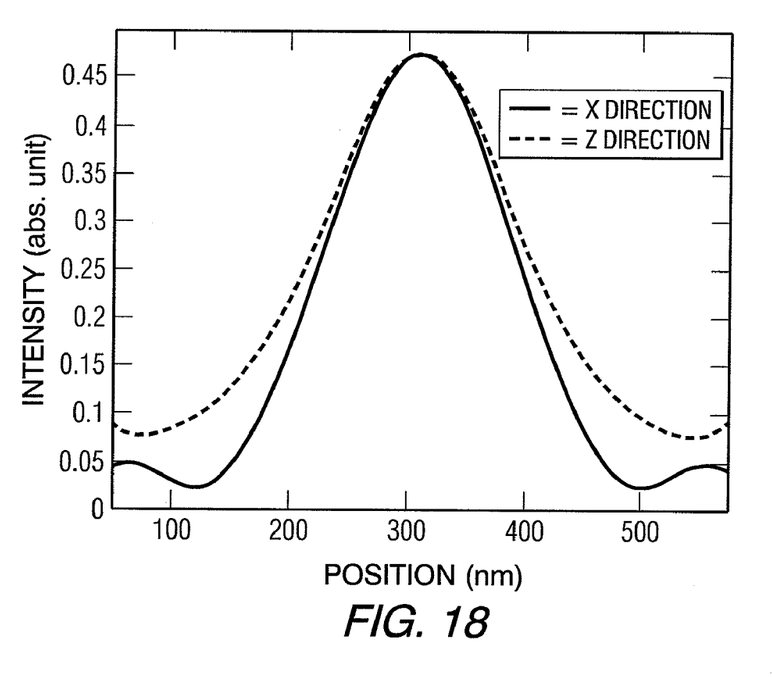

As a comparison, FIG. 18 shows the case without waveguide 14. The FWHM optical spot size is 178 nm along the X-direction and 203 nm along the Z-direction. The total absorption in the storage medium is 31.1%. This means that the hetero-structured metallic taper compresses the spot by a factor of about 14.6 with the light delivery efficiency of about 18%.

Figure 19:
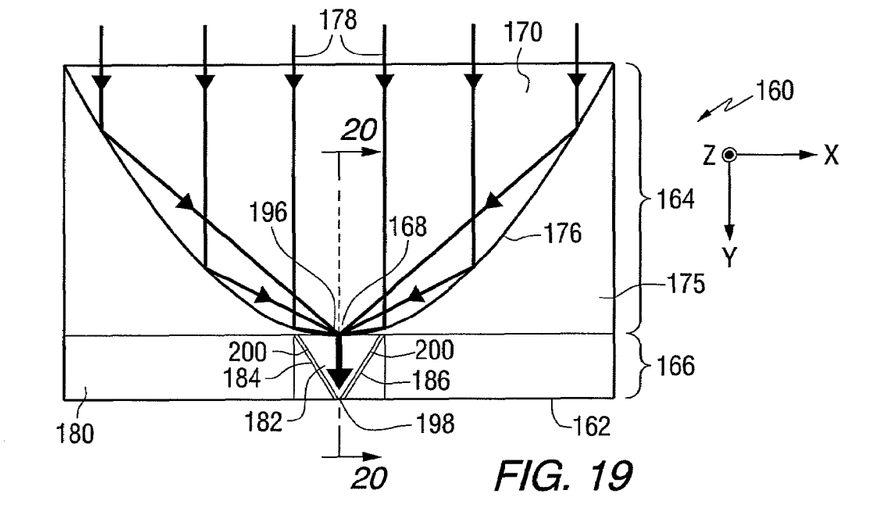
FIG. 19 is a cross-sectional view of an optical transducer in accordance with another aspect of the invention.
Figure 20:
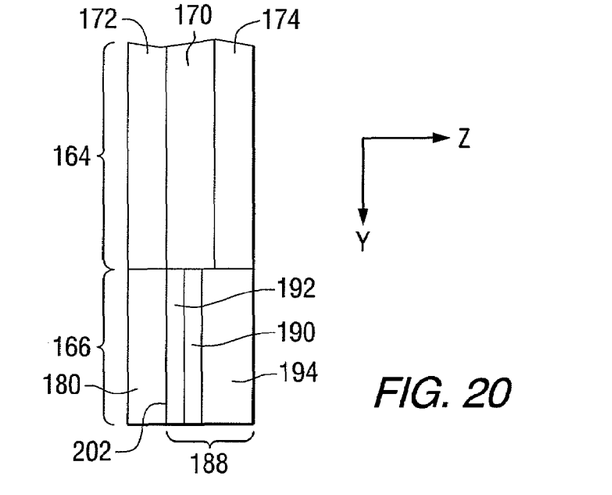
FIG. 20 is a cross-sectional view of the optical transducer of FIG. 19 taken along line 20-20.
Figure 21:
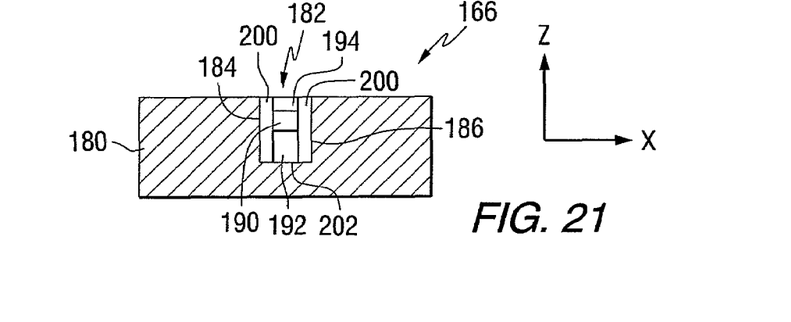
FIG. 21 is a plan view of a portion of an air bearing surface of the optical transducer of FIG. 19.

FIG. 19 is a cross-sectional side view of an optical transducer 160 in accordance with another aspect of the invention. FIG. 20 is a cross-sectional view of the optical transducer of FIG. 19 taken along line 20-20. FIG. 21 is a plan view of a portion of an air bearing surface 162 of the optical transducer of FIG. 19.

The optical transducer of FIGS. 19, 20 and 21 includes two waveguides 164 and 166. In this example, waveguide 164 is similar to the waveguide 12 of FIG. 1. Waveguide 164 is a planar waveguide where light is coupled into the waveguide and a focusing element is fabricated for focusing the light into a diffraction-limited spot in a focus or focal region 168. The waveguide in this example forms a solid immersion mirror that includes a guiding layer 170, which can be, for example, $Ta_2O_5$, and cladding layers 172 and 174, which can be, for example, $Al_2O_3$. A material 175, which can be, for example, air or aluminum, is positioned adjacent to the sidewalls 176 for reflecting light rays 178 to the focus. An electromagnetic wave, which can be, for example, ultraviolet, infrared or visible light, is illustrated by arrows 178. Light traveling in the waveguide is reflected by the parabolic sidewalls 176 and directed to the focal region 168. The cladding layers would have a lower refractive index than the guiding layer. Air may be a suitable cladding layer. The focusing element in this example is a solid immersion mirror. However, other types of focusing elements such as a mode-index lens may also be used. Light can be launched into the waveguide 164 in many ways, such as using a grating coupling, using an end-fire technique, using a tapered waveguide, etc.

Waveguide 166 includes a metallic structure 180 that is shaped to define an opening or slot 182. In this example, the walls 184 and 186 of the opening are substantially planar, and converge in a direction toward the surface 162. Thus, the opening 182 is tapered along the Y-direction, which is parallel to the plane of the first waveguide 164. That is, the size of the opening decreases as the distance from the first waveguide increases. The walls lie in planes that are substantially perpendicular to the plane of waveguide 164. Each of the walls is tilted at an angle of between 0° and 60° with respect to the Y-axis.

Waveguide 166 further includes a multilayer structure 188, including a first layer 190 layer positioned between a second layer 192 and a third layer 194. The first layer serves as a core, or guiding layer. The second and third layers are cladding layers. Layers 190, 192 and 194 are stacked in the Z-direction.

Light directed to the focus of waveguide 164 enters the opening at a first end 196 and is further concentrated by waveguide 166 to form an optical spot at a second end 198 of the opening. In one example, the layers are dielectric materials, with the core layer 190 being a different material than the outer layers 192 and 194. The opening can be tapered such that the first end 196 is wider than the second end 198.

Within the opening, along the Z-direction, light is confined by refractive index of the outer cladding layers 192 and 194. Along the X-direction, the light is confined by the walls 184 and 186 opening. The opening can be tens of nanometers at the bottom end. For good light transmission efficiency, the opening can be tapered along the beam propagation direction, i.e., the Y-direction, and a thin layer 200 of dielectric material with low index of refraction can be coated on the inner walls 184 and 186 of the opening. The tapered portion of waveguide 166 is positioned in a slot 182 defined by a metallic member 180. The slot includes walls 184 and 186 positioned on opposite ends of layers 190, 192 and 194. The slot further includes a third wall 202. The second layer 192 of dielectric material is positioned between the first layer 190 and the third wall 202. The third wall confines the optical spot in the Z-direction. Layer 194 can be air. A magnetic pole for magnetic recording may be integrated in this device from the Z-direction, or from the X-direction. For example, when used in a magnetic recording head, a magnetic write pole can be positioned adjacent to or within layer 194 of the structure of FIGS. 19-21.

In another example, the slot can be filled with a dielectric material, which can be the same as the dielectric material of the guiding layer of waveguide 164, or another dielectric material selected to provide good confinement along the Z-direction. Since waveguide 166 is short in the Y-direction, a material having a high index of refraction but little absorption can be used as the core layer, for instance, silicon. Also, the focal region of waveguide 164 may be positioned in waveguide 166 to achieve a more tightly focused beam at the bottom of the opening for enhanced transmission efficiency.

The waveguide 166 has no length limitation along the X-direction, which provides a heat dissipation channel to dissipate heat caused by light absorption in the slot waveguide.

Waveguide 166 includes a multilayer structure. The tapered portion can be constructed in three or more dielectric layers in the Z-direction. Along the X-direction, light is confined by the thin dielectric film 200. Regardless of how small the separation is, there exists a propagating TM mode, with the electric field polarized in the X-direction. Along the Z-direction, light is confined by the wall 202 of the slot in the metal member.

The full tapering angle of the slot walls 184 and 186 can vary from about 0° to about 120°, but an optimal angle might exist to provide the highest efficiency.

The need for a coating of low index of refraction material on the walls of the slot in the metallic member depends on the core material used in waveguide 166 and the wavelength λ of the electromagnetic wave. Surface plasmons (SP) are well-known electromagnetic waves that propagate along the interface between a dielectric material and a metal of permittivities $\in_0$ and $\in_m$. The conditions for the existence of SPs are TM polarization (i.e., a magnetic field parallel to the interface) and $\in_0 + \in_m < 0$. For example, with the Drude model for dielectrics of free electrons $\in_m = 1 - \omega_p^2/\omega^2$, where $\omega_p$ is the bulk plasma frequency and ω is the angular frequency, these conditions lead to a high frequency cutoff at $\omega_c = \omega_p/\sqrt{1+\in_0}$. For silver and gold, $\omega_p = 3.8$ eV. If silicon is used as the core material, $\in_0 = 13.54$ at λ=830 nm. This has a short-wavelength cut-off of $\lambda_c = 1.24$ μm. So, if the light wavelength is 830 nm, there will be no SP propagating at the silicon/gold interface. One way to surmount this is to insert a thin layer of dielectric material, having a low index of refraction $\in_1$ between the metal surface and the material of high index, wherein $\omega_c \rightarrow \omega_p/\sqrt{1+\in_1}$. For instance, $\in_1 = 2.13$ for silica, and $\lambda_c \geq 0.58$ μm. In this way, SP can propagate in waveguide 166 with silicon core at λ=0.83 μm.

The slot in waveguide 166 confines the light in the X-direction and also provides a high propagation constant, which leads to good confinement in the Z-direction, and a sharp gradient at the opening of the slot, where a magnetic pole might be placed for writing sharp transition data to a storage medium. Moreover, the tangential electric field would be zero inside the metal at the walls; and light can be much more confined to the core than in the case without the wall along the Z-direction. For instance, if $Ta_2O_5$ of index of refraction n=2.2 is used for the core material and $Al_2O_3$ (n=1.65) for the cladding material of the multilayer structure 188 of waveguide 166, simulation has shown that the mode confinement in full-width-at-half-maximum (FWHM) can be reduced at least to 80 nm. Note that the optimized FWHM is 160 nM for the corresponding slab waveguide without the metallic slot.

In one example, a solid immersion mirror (SIM) waveguide 164 focuses light onto waveguide 166. Using the example of FIGS. 19-21, the electric field strength and absorption at the middle plane of the storage layer have been computed. For the computation, the SIM was assumed to have a 50 µm top opening and ~6 µm ending. The incident beam parallel to the plane of the waveguide 164 was assumed to have a Gaussian profile of 50 µm at a $1/e^2$ diameter. The optical power is assumed to be 1 watt. A magnetic storage medium was assumed to include an 8 nm thick dielectric layer (n=1.5), a 15 nm thick cobalt layer, a 10 nm thermal barrier layer, and a gold heat sink layer coated on a glass substrate.

The two waveguides were assumed to use different core materials. The light wavelength was assumed to be λ=830 nm. Waveguide 164 included a 120 nm thick $Ta_2O_5$ core layer with the index of refraction n=2.20 and waveguide 166 included a 40 nm thick Si core layer with n=3.673+i0.005. Both waveguides included alumina for cladding layers in the direction parallel to the waveguide plane, with n=1.65. The two waveguides were assumed to join at the SIM focal plane. Gold was used as the metallic material for waveguide 2, n=0.188+i5.39.

The metal taper was set to have a 30 nm wide opening at the bottom and 230 nm wide opening at the top. The metal taper was 210 nm long. A 10 nm layer of $SiO_2$ was assumed to be filled between the taper walls and the waveguide. The taper walls were oriented to form a full angle of 53°. The slot gap was 120 nm along the Z-direction. The top $Al_2O_3$ cladding layer was 20 nm thick and the bottom one was 60 nm.

The computation showed that both the electric field and light absorption are confined and full-width-at-half-maximum FWHM=(44 nm, 56 nm). As expected, the field profile was asymmetric along the Z-axis and had a sharp gradient at the slot opening, where a magnetic pole can be placed nearby to write sharp magnetic transition. The total absorption in the 15 nm storage layer was calculated to reach 20%.

To compare the efficiency of the structure of FIGS. 19-21 to a structure having only the top waveguide, simulations for each structure were computed. Without the second waveguide, the absorption spot has a FWHM=(174 nm, 207 nm) and the total absorption, including the sidelobes, is 36%. Thus the metallic slot waveguide 166 compresses the spot by a factor of 15 and also enhances the peak intensity by a factor of 3.5.

The implementations described above and other implementations are within the scope of the following claims.

What is claimed is:

1. An apparatus comprising:
a first waveguide configured to focus an electromagnetic wave to a focal region; and
a second waveguide defining an opening having an end positioned adjacent to the focal region, the second waveguide including a first metallic layer, and second and third layers positioned on opposite sides of the first metallic layer, wherein the first metallic layer has a first propagation constant larger than propagation constants of the second and third layers.

2. The apparatus of claim 1, wherein the opening is tapered.

3. The apparatus of claim 2, wherein the opening includes walls arranged at an angle of between about 0° and about 120° with respect to each other.

4. The apparatus of claim 1, wherein the second and third layers are metallic.

5. The apparatus of claim 1, wherein the second and third layers are dielectric materials.

6. The apparatus of claim 1, further comprising:
a layer of dielectric material on a wall of the opening.

7. The apparatus of claim 1, wherein the first waveguide comprises:
a planar waveguide.

8. The apparatus of claim 7, wherein the electromagnetic wave is transverse-electric polarized with the electric field parallel to a plane of the first waveguide.

9. The apparatus of claim 1, further comprising:
a magnetic write pole having a tip positioned adjacent to the opening.

10. The apparatus of claim 1, further comprising:
a magnetic write pole having first and second tips positioned adjacent to the opening.

11. An apparatus comprising:
a first waveguide configured to focus an electromagnetic wave to a focal region; and
a second waveguide including a metallic structure defining an opening having an end positioned adjacent to the focal region and a multilayer structure positioned in the opening, the multilayer structure including a first layer of dielectric material, and second and third layers of dielectric material positioned on opposite sides of the first layer, wherein the opening in the metallic structure includes first and second walls adjacent to ends of the first layer of dielectric material and a third wall, wherein the second layer of dielectric material is positioned between the first layer of dielectric material and the third wall.

12. The apparatus of claim 11, wherein the opening is tapered.

13. The apparatus of claim 12, wherein the first and second walls are positioned at an angle of between about 0° and about 120° with respect to each other.

14. The apparatus of claim 13, wherein the first waveguide comprises a planar waveguide, and the first and second walls converge in a direction substantially parallel to a plane of the first waveguide.

15. The apparatus of claim 14, wherein the electromagnetic wave is transverse-electric polarized with the electric field substantially parallel to a plane of the first waveguide.

16. The apparatus of claim 11, wherein the first layer of dielectric material comprises silicon.

17. The apparatus of claim 11, further comprising:
a magnetic write pole having a tip positioned adjacent to the opening.

18. The apparatus of claim 11, further comprising:
a magnetic write pole having first and second tips positioned adjacent to the opening.

19. An apparatus comprising:
means for focusing an electromagnetic wave to a focal region; and
a waveguide defining an opening having an end positioned adjacent to the focal region, the waveguide including a first metallic layer, and second and third layers positioned on opposite sides of the first metallic layer, wherein the first metallic layer has a first propagation constant larger than propagation constants of the second and third layers.

20. The apparatus of claim 19, wherein the opening is tapered.

* * * * *

UNITED STATES PATENT AND TRADEMARK OFFICE
CERTIFICATE OF CORRECTION

| | | |
|---|---|---|
| PATENT NO. | : 7,440,660 B1 | |
| APPLICATION NO. | : 11/872927 | |
| DATED | : October 21, 2008 | |
| INVENTOR(S) | : Xuhui Jin et al. | |

It is certified that error appears in the above-identified patent and that said Letters Patent is hereby corrected as shown below:

Column 5, Line 8
"...of an air bearing surface 124 of the waveguide 122 ofFIG. 10."
Should read
"...of an air bearing surface 124 of the waveguide 122 of FIG. 10."

Column 6 Line 53
"...is 5.6%, and the total absorption in the 15 urnthick magnetic..."
Should read
"...is 5.6%, and the total absorption in the 15 nm thick magnetic..."

Signed and Sealed this

Twenty-second Day of December, 2009

David J. Kappos
*Director of the United States Patent and Trademark Office*